B. F. PAXTON.
SWIVEL FOR PIPES.
APPLICATION FILED JUNE 4, 1920.
1,409,022.
Patented Mar. 7, 1922.
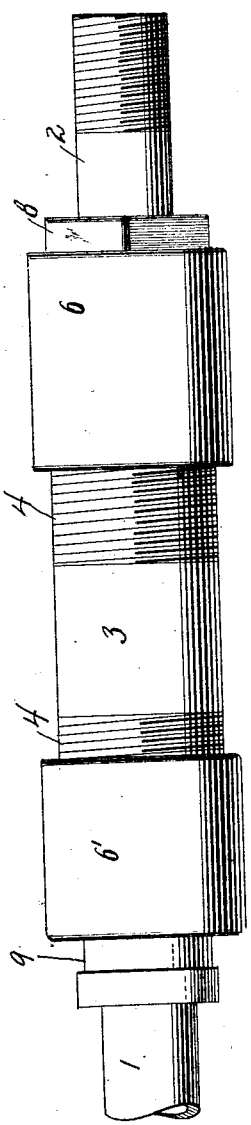
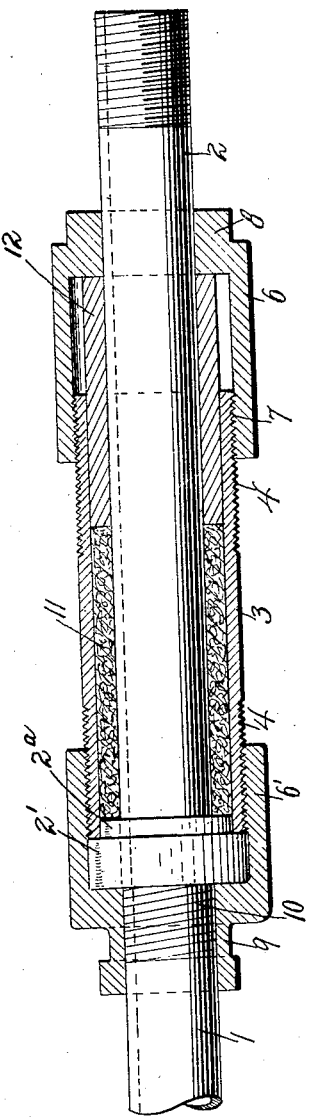
Inventor
B. F. Paxton
By Franklin N. Hagh
Attorney

UNITED STATES PATENT OFFICE.

BENJAMIN F. PAXTON, OF VALENTINE, NEBRASKA.

SWIVEL FOR PIPES.

1,409,022.   Specification of Letters Patent.   Patented Mar. 7, 1922.

Application filed June 4, 1920. Serial No. 386,428.

*To all whom it may concern:*

Be it known that I, BENJAMIN F. PAXTON, a citizen of the United States, residing at Valentine, in the county of Cherry and State of Nebraska, have invented certain new and useful Improvements in Swivels for Pipes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a swivel for the adjoining ends of two pipes, said swivel cooperating with one of said pipes so that the said pipe is swiveled in the coupling.

The invention is clearly shown in the accompanying drawing, in which:

Figure 1 is a view in side elevation of two pipes equipped with my swivel, and

Figure 2 is a view in central longitudinal section thereof.

Referring now in detail to the drawings:

1 and 2 designate two pipe sections, the latter being provided with an annular head 2', or integral enlargement, and with an integral collar 2ª of lesser diameter than the head 2' and adjoining the same.

As shown, a sleeve 3 encircles the pipe 2 and is provided toward both ends with exteriorly threaded portions 4, 4 adapted to be threaded onto coupling members 6 and 6'. The pipe 1 is threaded into the coupling member 6', while the pipe 2 projects loosely into the coupling member 6. When the sleeve 3 is screwed into the threaded coupling 6 it bears against the head 2', thus holding the pipe 2 against longitudinal movement, but permitting swiveling or rotary movement of the pipe in said coupling member 6'.

Encircling a portion of the pipe 2, and within the sleeve 3, is a packing 11, bearing, at one end, against the collar 2ª.

A cylindrical packing compression member 12 encircles the pipe 2 and projects into said sleeve 3, and bears, at one end, against the adjacent end of the packing 11. When the coupling member 6 is screwed on the adjacent threaded end 4 of the sleeve 3 the end of the member 6 contacts with the cylinder 12 and moves the same toward the packing 11, thus compressing the same.

I have, in the appended claims, referred to the members 6' and 6 by the expressions "first coupling member" and "second coupling member" respectively.

This swivel is to be of use on pipes for air, water, steam, gas, oil, or any place a swivel is needed in pipes.

What I claim to be new is:

The combination of two pipes, two coupling members, one of said pipes being threaded with the first coupling, and the other pipe passing loosely through the second coupling member and being provided with a lateral head swiveled in said first coupling member, and a sleeve encircling said headed pipe, said coupling members being threaded on the respective ends of said sleeve, and said sleeve bearing laterally against said head, to prevent longitudinal movement of said headed pipe, a packing in said sleeve and encircling said headed pipe, and a cylindrical member projecting at one end into said sleeve, and at its other end into said second coupling member and encircling said headed pipe, and bearing, at one end, against one end of said packing.

In testimony whereof I hereunto affix my signature.

BENJAMIN F. PAXTON.